(12) United States Patent
Chen

(10) Patent No.: US 7,609,865 B2
(45) Date of Patent: Oct. 27, 2009

(54) 3D FINGERPRINT AND PALM PRINT DATA MODEL AND CAPTURE DEVICES USING MULTI STRUCTURED LIGHTS AND CAMERAS

(75) Inventor: Feng Chen, Houston, TX (US)

(73) Assignee: Biomagnetics, Houston, TX (US)

( * ) Notice: Subject to any disclaimer, the term of this patent is extended or adjusted under 35 U.S.C. 154(b) by 555 days.

(21) Appl. No.: 11/269,312

(22) Filed: Nov. 8, 2005

(65) Prior Publication Data
US 2006/0120576 A1  Jun. 8, 2006

Related U.S. Application Data

(60) Provisional application No. 60/625,836, filed on Nov. 8, 2004.

(51) Int. Cl.
*G06K 9/00* (2006.01)
(52) U.S. Cl. .................................................. 382/124
(58) Field of Classification Search ................. 382/115, 382/124, 154, 215; 340/5.52, 5.53; 713/186; 345/419–420; 902/3
See application file for complete search history.

(56) References Cited

U.S. PATENT DOCUMENTS

| 5,483,601 A * | 1/1996 | Faulkner ..................... 382/115 |
| 7,174,033 B2 * | 2/2007 | Yukhin et al. ................ 382/115 |
| 2003/0084305 A1 * | 5/2003 | Siegel et al. ................. 713/186 |
| 2005/0152584 A1 * | 7/2005 | Svedin ........................ 382/124 |
| 2006/0039048 A1 * | 2/2006 | Carver et al. .................. 359/32 |

* cited by examiner

*Primary Examiner*—Daniel G Mariam
(74) *Attorney, Agent, or Firm*—Madan & Sriram, P.C.

(57) ABSTRACT

A method and system for biometric identification utilizes structured light (e.g., fine grid) that is projected to the target objects (fingers and palm). The image with structured light on the object contours can give 3D information of the objects with resolution to satisfy NIST fingerprint standard. In embodiments, the structured light can be of different color, to reduce the burden of the software processing. To enhance the capture speed, a model with 2D image on "smooth" 3D surface can be used. In this "2.5-D" case, the finest feature of the structured light can be as big as millimeter size. Although grid-structured light can satisfy current requirement of fingerprint and palm print capture standards, in other embodiments, a customized structure based on the initial scan result can give optimal result on the 3D data. This may be useful when higher resolution is desired.

18 Claims, 3 Drawing Sheets
(2 of 3 Drawing Sheet(s) Filed in Color)

3D FINGERPRINT AND PALM PRINT DATA MODEL AND CAPTURE DEVICES USING MULTI STRUCTURED LIGHTS AND CAMERAS

CROSS-REFERENCE TO RELATED APPLICATIONS

This application takes priority from U.S. Provisional Patent Application Ser. No. 60/625,836 filed on Nov. 8, 2004.

FIELD OF THE INVENTION

The present invention relates to fingerprint authentication and, more specifically, to a method and system for mapping a fingerprint image.

BACKGROUND OF THE ART

Examination of the fingerprints or other biometric features of an individual is a well known technique to establish a person's identity. In the past, fingerprints were recorded by applying ink to the finger and then rolling the finger on a piece of paper. Agencies then maintained these originals, or photocopies or photographs of the originals. Later comparison of these archives with a live or latent fingerprint could prove to be quite tedious and time consuming. More recently, methods have arisen to create fingerprint images that can be captured directly electronically for storage and/or analysis by a computer, or photographically for storage on film.

Advances in digital data analysis and data exchange have helped increase the availability and effectiveness of using fingerprints and palm prints for establishing identification. For instance, digital image acquisition techniques, networked electronic database, and mature software for searching and matching through the database have made it easier to capture, analyze and share biometric information such as fingerprints. However, serious challenges persist in at least three aspects: accurate and fast image acquisition, fingerprint and palm print recognition and identification software, and high performance data server/client speeds.

With respect to image acquisition, current technologies can be difficult to use and too often produce fingerprints and palm prints of poor quality. The limitations of current technologies include: the need to have a trained technician grasp and manipulate a person's finger or hand (frequently with multiple attempts) to successfully capture the print; the ability to capture rolled fingerprints and palm prints only one at a time; the corruption of image quality by just a small amounts of contamination or excessively dry or moist skin; the fact that fingerprints and palm prints of some persons with fine or worn friction ridges cannot be captured; relative slowness, with impressions taking anywhere from 5 minutes or more to capture; and high acquisition and maintenance costs.

The present invention addresses these and other drawbacks of the prior art.

SUMMARY OF THE INVENTION

In aspects, the present invention provides a three-dimensional (3-D) or hybrid two-dimensional (2-D) (e.g., a 2-D image overlapping a 3-D image) model for biometric purposes such as captures of fingerprints, palm prints, foot prints etc. In one embodiment, a multi-camera and lighting system is used to digitally capture a target object such as a fingerprint. In operation, fine-grid-structured lights from different directions are projected to the target object and the images are captured from cameras at different angles. A computer system can be used to control this process. The captured digital images are processed to provide either a 3-D or hybrid 2-D model of the target object. The 3-D and 2.5-D fingerprinting offer supersets of the conventional 2-D fingerprinting technology.

In embodiments, the process obtains all or most of the fingerprint and palm-print information at once. Moreover, the difficulties posed by fine features and/or worn friction ridges are minimized by the use of multiple angles. It is believed that embodiments of the present invention have many advantages over the currently existing fingerprinting technologies including significantly faster image capture and processing times, ease of use, and relatively higher success rates. It is further believed that embodiment of the present invention can acquire the equivalent of 10 conventionally rolled fingerprints in less than 15 seconds. In some embodiments, all the fingerprints are taken at once. In other embodiments, multiple acquisitions are used to cover the dead-angles of the members such as thumbs. In addition, data models created by embodiments of the present invention may simulate different ways a person can leave his/her fingerprint and palm print on a flat surface or even multiple curved surfaces.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
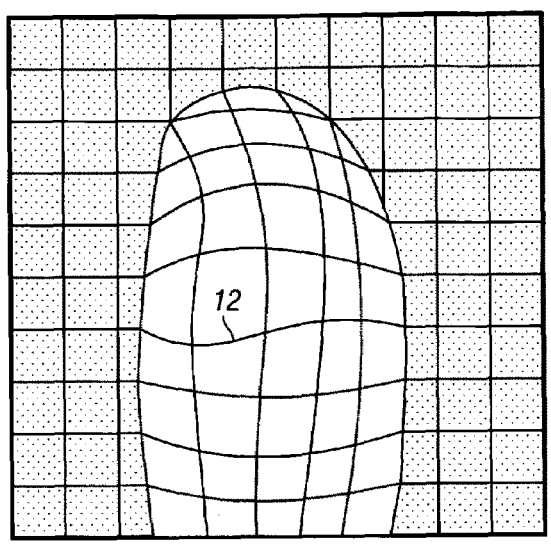
FIG. 1 illustrates an exemplary grid of structured light projected onto a finger.

The present invention relates to devices and methods for acquiring, processing and storing biometric information. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

By way of background, the conventional rolled-fingerprint originates from the criminal scene, where the biometric features are the lines of the ridge after a finger has been pressed onto a flat surface. In order to use the fingerprint as an identifying factor, an important feature of the rolled-fingerprint is that of the lines or ridges. The traditional inked method to obtain fingerprint is uses this factor and proper inking and rolling techniques will produce a satisfactory fingerprint data image. Conventional electronic methods for obtaining fingerprint work the same way. For instance, the fingerprint is then combined from factions of the image taken at the "real time" by charged coupled devices (CCDs).

It is believed that a 3D representation of a biological specimen such as a finger or palm is one accurate method to record biometric information. The rolling of a finger to obtain a fingerprint depends on many other factors, including how much force is applied, how much ink or grease is applied, and which direction is the finger rolled. A same finger may also have different dryness at different times, which will produce different 3D and 2D representations. However, regardless of the different times that the 3D fingerprint data is recorded, conventional software can "unfold" the drapes, create a 2D fingerprint representation corrected for the above described factors, and compares the 2D representation to a previously recorded 2D fingerprint. In short, 3D image is a superset of the conventional 2D rolled-finger image and can solve the problem that some drapes are really hard to be unfolded by just rolling.

While a 3D data model may be an accurate method to preserve fingerprint information, the acquisition of storage of such data storage may not be cost-effective. Thus, embodiments of the present invention use a hybrid or pseudo-3D data model. A 3D object, such as a finger, can be viewed as a smooth 3D curved surface, with variation of height perpendicular to a reference surface. Traditionally, to obtain a fingerprint, the finger is pressed against a flat surface and the portions that have heights higher than certain threshold are recorded with the color black. Embodiments of the present invention use a hybrid of the 3D and 2D representations ("2.5D"). In one embodiment, a finger or palm is digitally represented as a smooth 3D curved surface. At each pixel, the portions having heights higher than a certain threshold are represented by a gray scale or darkness rather than the actual numerical height. Advantageous, a conventional rolled fingerprint image can be easily created by software that "rolls" the finger as represented by the smooth 3D curved surface. Factors such as different firmness and different unfolding of the drapes can be adjusted to get the best result, or to match a fingerprint that is poorly rolled, e.g., in a crime scene.

In one embodiment, structured light in a grid form is used to capture "raw" digital data for the target object. When this grid of light is shone to the target objects, the orthogonal grids will have topological deformation viewed as a 2D image from one angle as shown in FIG. 1. In FIG. 1, a structured light grid 10 has a portion 12 that is topologically deformed by a biological object (not shown). It is known in the field of computer vision to solve equations to construct a 3D image from this 2D projection with structured light, with the assumption of certain smoothness. In order to get accurate 3D details of each fingerprint or palm ridge, the resolution or dimension of the grid 10 should be smaller than the details of a biological feature such as a ridge, such that with the smoothness assumption, 3D details fine enough can still be preserved. It is believed, that 3D fingerprint data may need a grid of size between 10 to 100 micrometers to provide adequate identification.

Figure 2:
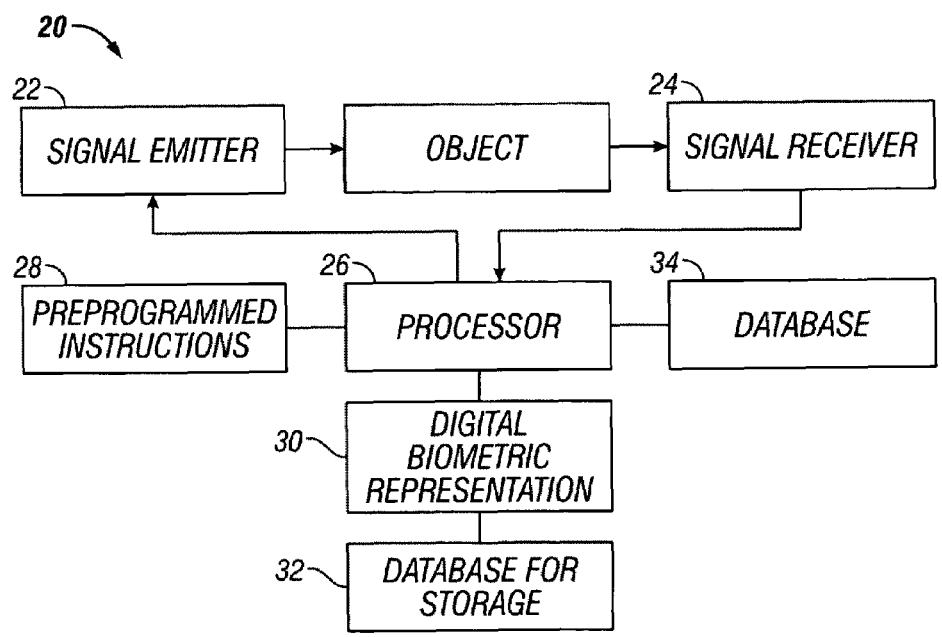
FIG. 2 schematically illustrates one embodiment of a system adapted to measure, process and record biometric information.

Referring now to FIG. 2, there is shown one embodiment a system 20 for obtaining a digital representation of a biological specimen. The FIG. 2 embodiments uses a light emission device 22 to emit a structured light grid, one or more receivers 24 to capture the image of the structured light grid on the object, and a processor 26 for processing the data collected by the receivers 24. In one arrangement, the light emission device 22 can be a laser lighting system adapted to produce structured light. Alternatively, a conventional lighting system can be used to illuminate the object. In still other embodiments, both structured laser light and conventional illumination can be used. The receivers 24 can include one or more devices such as digital cameras. In some applications, a single shot from multiple cameras with multiple laser lights from different angle and one illumination light can be sufficient to develop a suitable 2.5 D or 3D representation of the object. The processor 26 can include preprogrammed instructions 28 that differentiate the part due to the laser lights and the part due to the illumination light. In an exemplary mode of operation, the laser lights and flash lighting illuminate the object at very short intervals to lower the processing burden on the processor 26. It is believed that optimization of the process can be achieved by selecting laser lights of different colors (light frequencies) for different angles, and/or using one colored laser with multiple exposure.

In one embodiment, a grid of size ~0.3-1 mm is used. In this case, large drapes and the overall contour of the 3D objects which are larger that the grid are preserved, while the rest of the information of the fingerprint are extracted by the structured light method. The preprogrammed instructions 28 process the image data by representing the relevant lines of the ridges data with a grayscale format rather than the numerical value of how high is each ridge and so on. In one mode of operation, the biometric data 30 is a collection of x-y-z coordinates that describe the object as a 3D data model. In another embodiment, the biometric data 30 is a "2.5D" data model wherein the height of each pixel on the 3D curved surface is represented by the grayscale. Thus, the 2.5D data model does not include height information (i.e., the z coordinate). Thus, the 3D data model embodiment is a superset of the 2.5D data model embodiment, which in turn is a superset of the current 2D model that on which the ANSI/NIST ITL 1-2000 Standard is based. The data 30 can be transmitted to a database 32 for storage and later retrieval. Also, in embodiments, the data 30 can be used to search a previously constructed database 34 for identification purposes.

In embodiments, to enhance the speed of capturing, the exemplary system 10 can project multiple structured lights and capture images using multiple cameras at different angle to cover all the area of an object at once. The performance could be further enhanced with structured lights of different colors, different shapes (other than grid). Additionally, if the image capture and post-processing are fast enough, an optimized structure of the lights can then be generated by the processor 26 and the processor 26 can optimize the light emitted by the signal emitter 22 for the target object to improve resolution. That is, for example, the processor 26 can if needed iterate the image retrieval to improve resolution.

It is believed that embodiment of the described methods and systems are sufficient to meet the current needs for fast fingerprint and palm print capturing (e.g., 10 seconds for all the 10 fingerprints), and the image can have enough resolution and can be converted to the ANSINIST ITL 1-2000 Standard for fingerprint data format.

Figure 3:
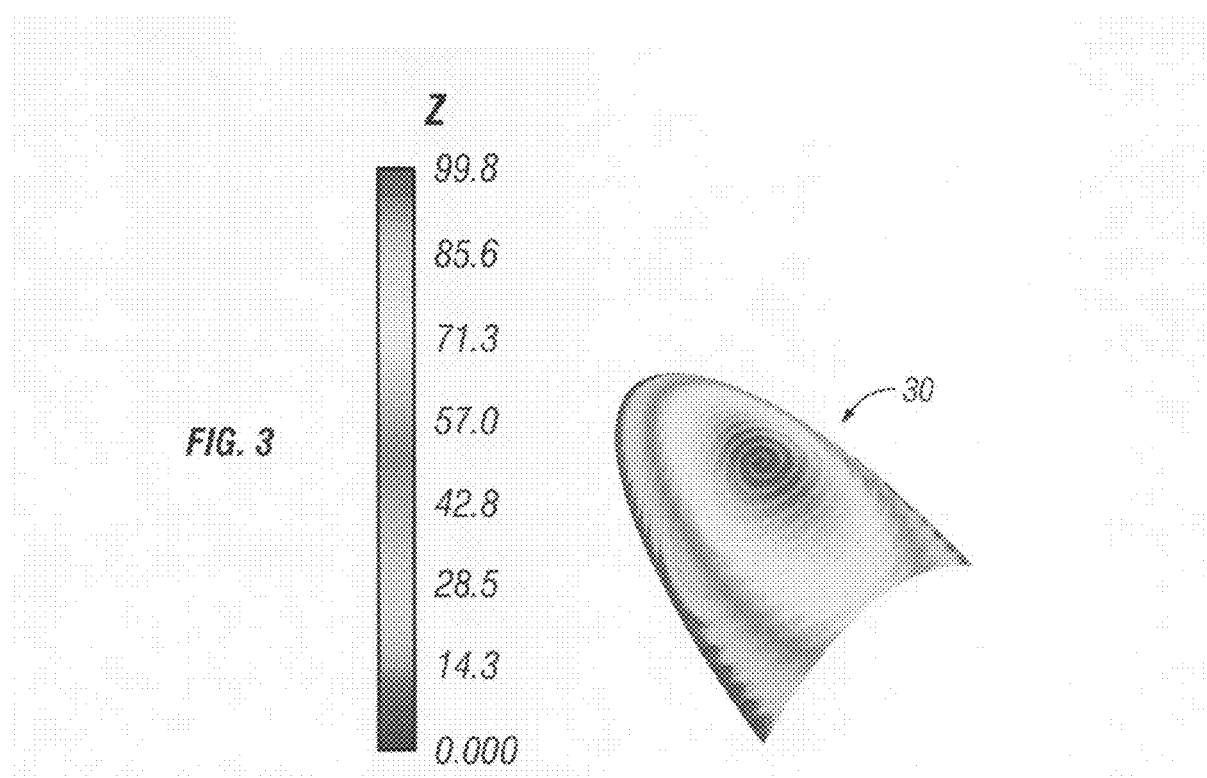
FIG. 3 graphically illustrates 3D fingerprint data represented with a color scale wherein data is stored in x-y-z coordinates.

Referring now to FIG. 3, there is pictorially shown an illustrative 3D data set 30 produced by the FIG. 2 embodiment. The 3D data set 30 is made up of x-y-z coordinates. In the FIG. 3 representation, the gray scale is used merely to visually display the z coordinate.

Figure 4:
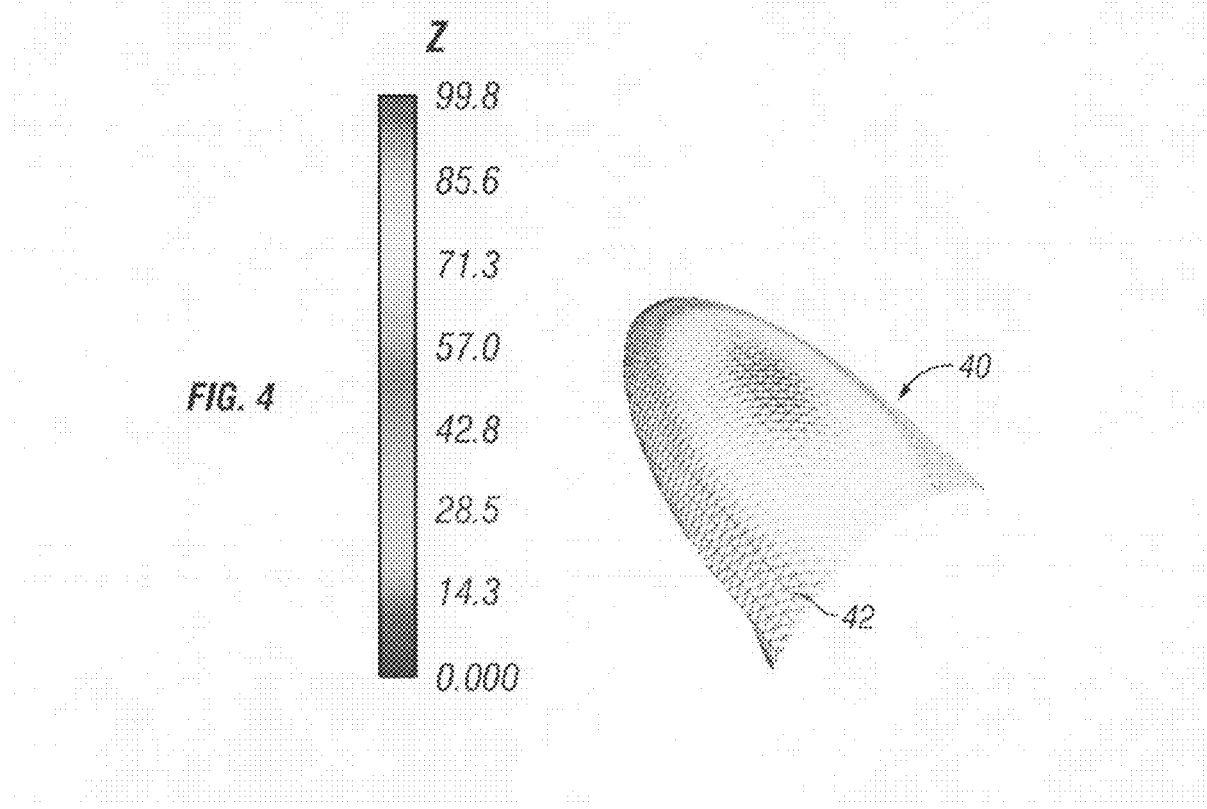
FIG. 4 graphically illustrates 3D fingerprint data represented with a color scale wherein x-y-z coordinates are stored in relation to triangular grids.

Referring now to FIG. 4, there is pictorially shown an illustrative coarse 3D data set 40 produced by the FIG. 2 embodiment. The signal emitter 22 (FIG. 2) can use a structured light having a triangular grid format. Other geometric grid formats such as squares or pentagons can also be used. The 3D data set 40 is made up of x-y-z coordinates. In the FIG. 4 representation, the x-y-z coordinates are stored at each vertex or node 42, which significantly reduces the amount of information that must be stored.

Figure 5:
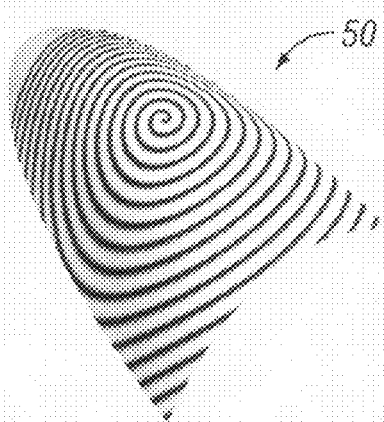
FIG. 5 graphically illustrates 2D fingerprint data.

Referring now to FIG. 5, there is pictorially shows one view of a texture data set 50 of a three dimensional surface 50 produced by the FIG. 2 embodiment. The signal emitter 22 (FIG. 2) can use conventional light shone on the object at different angles to produce the texture data set 50. The texture data set 50 does not include numerical height information but provide an indication of the relative positions of the surfaces. That is, the data set 50 shows that one surface is vertically disposed from another surface but does not provide a numerical value for the vertical distances between the two surfaces. For simplicity, this information will be referred to as "texture." The data set 50 thus shows one version of a 2.5D data set. The data set 50 is stored in three parts: (i) the FIG. 4 data set 40, (ii) the mapping of the FIG. 4 data set 40 onto a reference plane, and (iii) a 2D image of data set 50 from the same mapping as for (ii) with some processing such as linear interpolation.

Figure 6:
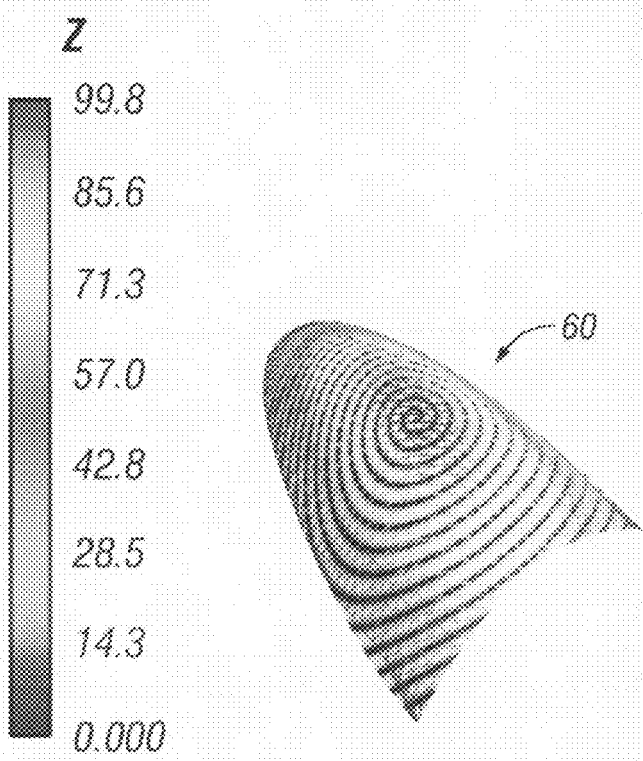
FIG. 6 graphically illustrates 2.5D fingerprint data represented with a color scale wherein the FIG. 4 data is overlaid onto the FIG. 5 data.

Referring now to FIG. 6, there is pictorially shown one view of the FIG. 5 data set 50 overlaid on one view of the FIG. 4 data set 40. It illustrates how the procedure (iii) in the last paragraph can use the same mapping of (ii). The signal emitter 22 (FIG. 2) can use a structured light having a triangular grid format and conventional light. The 2.5D data set 50 is made up of x-y-z coordinates from the data set 40 of FIG. 4, the data set of the mapping in (ii) and the mapped 2D image of the texture of procedure (iii). A single map can be used to store the data. However, one could define various mappings that exactly describe to different finger-scrolling scenarios; this is a big advantage to save the data in this 2.5D compare to the regular 2D fingerprints.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

I claim:

1. A system for determining a biometric feature, comprising:
   (a) a light source emitting a structured light on an object having the biometric feature;
   (b) a recorder configured to capture an image of the object in a digital form; and
   (c) a processor that produces a data set representative of a surface of the object by analyzing the topological deformations in the captured image, the data set including x-coordinates, y-coordinates, and one of (i) grayscale, and (ii) texture.

2. The system of claim 1 wherein the data set is stored in one of (i) a 3D surface, and (ii) smoothed 3D surface with texture.

3. The system of claim 1 wherein the structured light has a form selected from one of (i) a grid, and (ii) a web.

4. The system of claim 1 wherein the light source emits the structured light and an illuminating light; and wherein the processor includes instructions for differentiating a part due to the structured light and a part due to the illuminating light.

5. The system of claim 1 wherein the recorder includes at least one camera.

6. The system of claim 1 wherein the recorder captures images from a plurality of angles.

7. The system of claim 1 wherein the light source, recorder and the processor cooperate to capture a plurality of images substantially simultaneously.

8. A method for determining a biometric feature, comprising:
   (a) illuminating an object having the biometric feature with a light source;
   (b) capturing an image of the illuminated object in a digital form; and
   (c) processing the image with a processor to produce a digital representation of the object wherein topological variations in the digital image are recorded in x-coordinates, y-coordinates and grayscale; and
   (d) constructing a database using the image.

9. The method of claim 8 wherein the light source emits a structured light.

10. The method of claim 8 wherein the recorder includes at least one camera.

11. The method of claim 8 wherein the recorder captures images from a plurality of angles.

12. The method of claim 8 wherein the light source illuminates the object with a grid and the processor records the topological deformities of the grid in grayscale.

13. The method of claim 8 wherein the illuminating uses a structured light and an illuminating light; and further comprising differentiating a part due to the structured light and a part due to the illuminating light while processing the image.

14. A method for preserving information relating to a biometric feature, comprising:
   illuminating an object having the biometric feature with a light source;
   capturing an image of the illuminated object in a digital form with a digital camera;
   processing the image with a processor to produce a 2.5 D data set, wherein the 2.5 D data set includes an X coordinate, a Y-coordinate, and one of (i) grayscale, and (ii) texture; and
   constructing a database using the 2.5 D data set.

15. The method of claim 14 wherein the image is captured from a plurality of angles.

16. The method of claim 14 wherein the illuminating uses a structured light and an illuminating light; and further comprising differentiating a part due to the structured light and a part due to the illuminating light while processing the image.

17. The method of claim 14 wherein the texture is a relative vertical distance.

18. The method of claim 14 wherein the grayscale replaces a height value.

* * * * *